United States Patent [19]
Schimke

[11] 3,870,858
[45] Mar. 11, 1975

[54] THERMOSTAT MOUNTING

[75] Inventor: Thomas O. Schimke, Fern Creek, Ky.

[73] Assignee: General Electric Company, Louisville, Ky.

[22] Filed: Nov. 9, 1973

[21] Appl. No.: 414,382

[52] U.S. Cl. ............... 219/328, 134/107, 219/441
[51] Int. Cl. ............................................. F24h 1/00
[58] Field of Search ........ 68/15, 16; 134/57 D, 105, 134/107; 219/328, 338, 441, 442

[56] References Cited
UNITED STATES PATENTS

| | | | |
|---|---|---|---|
| 3,059,092 | 10/1962 | Olson | 219/328 X |
| 3,147,366 | 9/1964 | Dreyfoos | 219/338 X |
| 3,369,105 | 2/1968 | Wheeler | 219/328 X |
| 3,397,708 | 8/1968 | Braden | 134/107 X |
| 3,781,521 | 12/1973 | Kircher | 219/442 |

Primary Examiner—J. V. Truhe
Assistant Examiner—N. D. Herkamp

[57] ABSTRACT

There is disclosed a dishwasher having a unipartite plastic tub which is interiorly heated. A thermostat is mounted exteriorly of the tub and binds against an imperforate wall section. The thermal gradient across the imperforate plastic wall is determinable and the thermostat is calibrated to deenergize the heater in response to a predetermined temperature inside the tub.

8 Claims, 4 Drawing Figures

THERMOSTAT MOUNTING

BACKGROUND OF THE INVENTION

Thermostats are typically provided in dishwashers to deenergize the heating element in response to a predetermined high temperature in the wash chamber. Typical thermostats project through an opening in the tub bottom below the water level to directly sense water or air temperature in the wash chamber depending on whether the dishwasher is in a wash or dry portion of the operating cycle. Since the thermostat projects through an opening in the tub, means are necessarily provided to assure a watertight seal about the thermostat.

Thermostat mountings of this type have proved satisfactory with metallic dishwasher tubs. The development of plastic dishwasher tubs has created difficulty in sealing about the thermostat opening since many plastic materials creep at moderate temperatures and pressures. It is evident that temperatures in the neighborhood of 200°F are common in dishwashers. Upon analysis, it will be evident that plastic material around a conventional thermostat opening is subject to compression by a conventional nut-washer sealing arrangement. It is thus clear that seals around a conventional thermostat opening may deteriorate with use.

It is an object of this invention to provide an improved thermostat mounting and particularly an improved dishwasher thermostat installation.

In summary, this invention comprises a dishwasher including a tub and a door together providing a wash chamber, means for heating the wash chamber, a thermostat for de-energizing the heating means in response to a predetermined temperature in the wash chamber and means mounting the thermostat in heat exchange relation with the wash chamber wherein the tub includes an imperforate wall section, the thermostat includes a heat transfer member mating with the imperforate wall section, and the mounting means includes means binding the member against the imperforate wall section.

Figure 1:
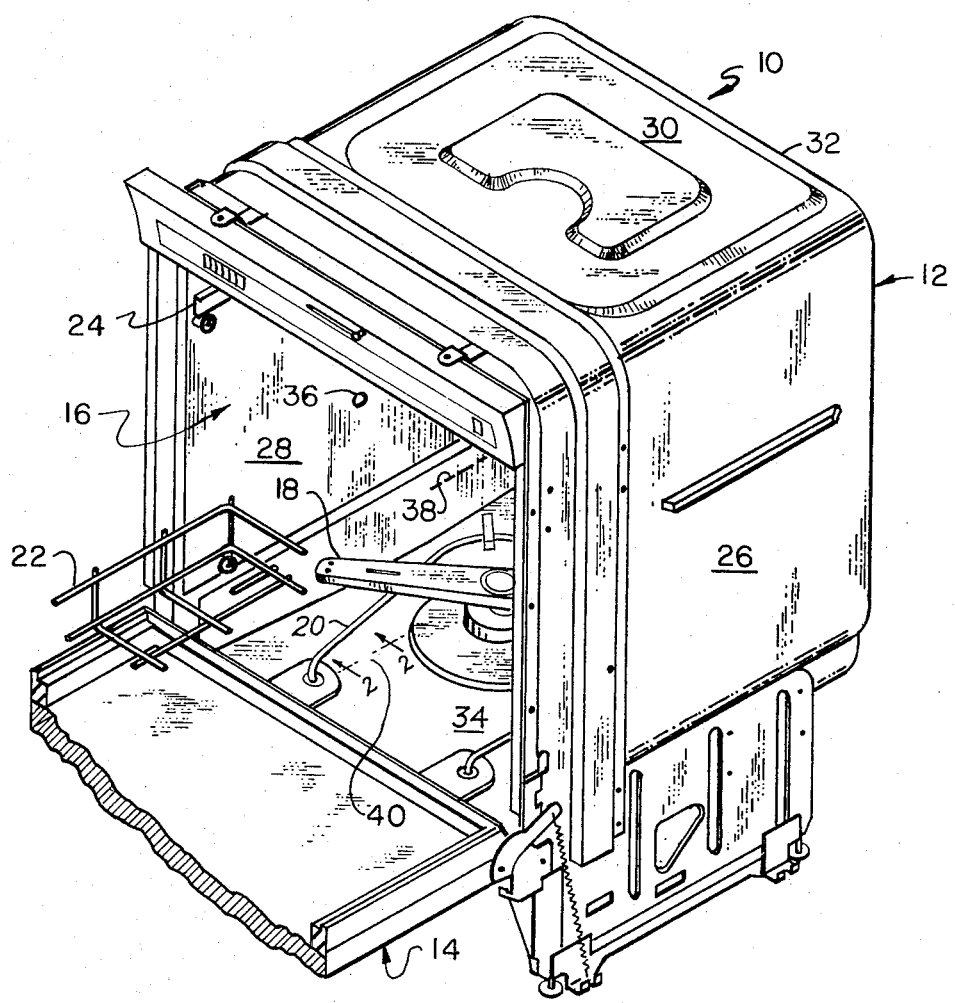
FIG. 1 is an isometric view of a dishwasher, certain parts being broken away or omitted for purposes of clarity.

Referring to FIG. 1, there is illustrated a dishwasher 10 comprising a tub 12 and a door 14 together providing a wash chamber 16. Other major components of the dishwasher 10 include a spray arm 18, a resistive heating element 20, a lower rack 22 and an upper rack (not shown) mounted by suitable means 24 for movement into and at least partially out of the wash chamber 16.

The tub 12 is illustrated as a unipartite plastic structure such as disclosed in U.S. Pat. Application Ser. Nos. 319,199; 319,201; 319,203; 319,555; 319,556; 319,557; all filed Dec. 29, 1972, now issued as U.S. Pat. Nos. 3,834,784; 3,821,961; 3,826,553; 3,834,783; 3,822,084; and 3,822,029, respectively, all of which are assigned to the assignee of this invention, to which reference is made for a more complete description thereof. The tub 12 includes side walls 26, 28, a top 30, a back wall 32 and a tub bottom 34. The side wall 28 may be provided with a fill opening 36 through which the tub 12 is filled with water. During the wash or rinse portions of the operating cycle, the tub 12 is filled to a water level represented by the dashed line 38.

The tub bottom 34 includes an imperforate section 40 against which is mounted a thermostat 42. The thermostat 42 is received in a receptacle 44 secured to the tub 12 by mounting means 46.

The thermostat 42 is a substantially conventional thermostat such as a Model Series 2,455 of Elmwood Sensors. The thermostat 42 comprises a plastic body 48, a metallic heat transfer member 50 and a pair of prong type terminals 52 connected to a bimetal switch (not shown) inside the body 48. The heat transfer member 50 comprises the modified part of the conventional thermostat. The heat transfer member 50 comprises a flat top 54 for mating engagement with the generally planer undersurface 56 of the imperforate wall section 40, a generally cylindrical wall 58 pressed over the interior components of the thermostat 42 and a flange 60 extending away from the cylindrical wall 58.

The receptacle 44 and the cooperation thereof with the thermostat 42, the imperforate wall section 40 and the mounting means 46 constitute an important part of this invention. The receptacle 44 and mounting means 46 have several important functions including pressing or binding the heat transfer member 50 against the tub bottom 40 regardless of thermal expansion and/or warping of the tub bottom 40 within a reasonable range of manufacturing tolerances, at least partially thermally insulating the thermostat 42 from heat transfer to air under the tub bottom 34, captivating lead wires from the thermostat 42, assuring electrical connection between the lead wires and the terminal prongs 42 and other functions as will be more fully apparent hereinafter.

To these ends, the receptacle 44 comprises a unitary or one-piece molded body of low heat transfer plastic such as may be obtained from Dupont Chemical Co. under the tradename Zytel 122 nylon. The receptacle 44 comprises a thermostat receiving section 62, a lead wire receiving section 64 and a pair of mounting arms 66, 68.

The thermostat receiving section 62 comprises a rectilinear peripheral wall 70 defining a thermostat receiving cavity 72 and presenting a generally flat upper edge 74 for abutting the flange 60 and thereby establishing a predetermined relationship between the imperforate wall section 40, the thermostat 42 and the receptacle 44 upon urging or pressing the receptacle 44 toward the imperforate wall section 40. The cavity 72 is desirably somewhat larger than the thermostat body 48 thereby providing an essentially dead air space around the body 48. It will also be noted that the cavity 72 is essentially rectangular in cross section while the thermostat body 48 is cylindrical which likewise produces a dead air space around the body 48. Because of this dead air space, the low heat transfer properties of the peripheral wall 70 and the fact that the bulk of the thermostat 42 is received by the cavity 72, there is provided a substantial measure of thermal insulation for the thermostat 42. Consequently, heat transferred across the wall 40 to the heat transfer member 50 and consequently to the thermostat 42 is not dissipated to any substantial extent. Thus, heat transfer across the wall 40 to the member 50 is effective in actuating the bimetal element in the thermostat 42.

At first blush it would appear that the thermostat 42 is not as responsive to temperature in the wash chamber 16 as a conventionally mounted thermostat. This has not proved to be the case for several reasons. First, the thickness of the imperforate wall section 40 and the heat transfer capability thereof are readily controlled and determined. Thus, the thermal gradient across the wall section 40 is readily ascertained. Second, conventionally mounted thermostats incorporate a relatively massive metallic fastening mechanism having the capability of absorbing significant quantities of heat. Since the fastening mechanism is capable of heat transfer to the air space underneath its associated tub, there is considerable heat transferred to the conventionally mounted thermostat which is not effective in affecting the bimetal elements. In contrast, there is relatively little heat transfer from the thermostat 42 of this invention to the air space under the tub 12. Tests performed with prototypes of this invention indicate an equivalent or slightly better response than conventionally mounted thermostats.

The lead wire receiving section 64 incorporates the principles presently utilized by the assignee of this invention in production dishwashers. The section 64 provides a pair of spaced terminal receiving passages 76, 78 for receiving and retaining a connector 80 designed to accept the terminal prongs 52 of the thermostat 42. The connectors 80 typically include a generally flat base 82 having curled edges 84 and a crimp type socket 86 for accepting one or more lead wires 88. The spacing between the curled edges 84 is designed to receive snugly the prongs 52.

Figure 4:
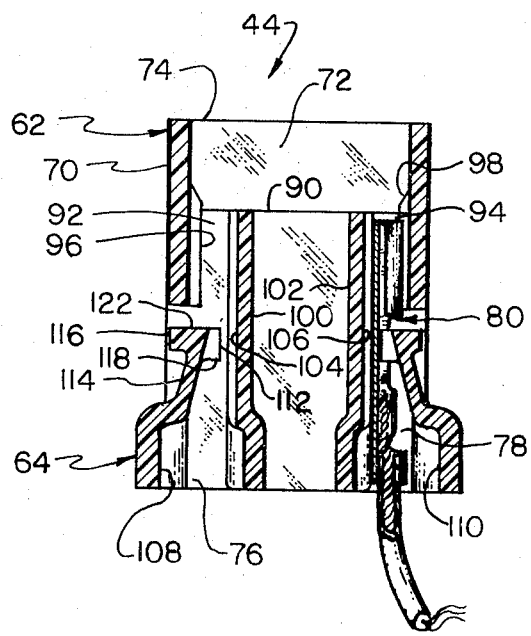
FIG. 4 is an enlarged cross sectional view of FIG. 3 taken substantially along line 4—4 thereof as viewed in the direction indicated by the arrows.

Referring to FIG. 4, the interior details of the receptacle 44 are illustrated. Underlying the cavity 72 is a shoulder 90 which is visible on the exterior of the receptacle. The distance between the shoulder 90 and the edge 74 is preferable greater than the dimension of the thermostat body 48 beneath the flange 60. Accordingly, the position of the thermostat 42 is preferably controlled by the edge 74 and not the shoulder 90. The thermostat receiving section 62 provides prong receiving passages 92, 94 respectively aligned with the passages 76, 78. Extending longitudinally through the passages 92, 94 is a rib 96, 98 respectively for camming the prongs 52 inwardly toward the passages 92, 94 in the event the prongs 52 are splayed. The passages 92, 94 and the passages 76, 78 are bounded on one side by a partition 100, 102. The partitions 100, 102 provide a slot 104, 106 respectively facing the ribs 96, 98. The passages 76, 78 provide enlarged openings 108, 110 thereto for accommodating relatively large wires.

During assembly of the thermostat 42 in the receptacle 44, the connector 80 and the attached lead wire or wires 88 are inserted through the opening 108 into the passage 76 until the leading end of the connector 80 engages a camming face 112 carried by a resilient tang 114 projecting inwardly of the passage 76. The tang 114 may include a shoulder 116 thereon which may be grasped by a pair of needlenose pliers to pull the tang 114 outwardly to release the connector 80. As the connector 80 proceeds past the cam face 112, the leading edge 118 of the cam face 112 engages an abutment 120 on the connector 80 thereby preventing further insertion of the connector 80. If one attempts to withdraw the connector 80 merely by pulling thereon, the trailing edge 122 of the tang 114 engages a rear shoulder 124 formed by the curled edges 84 on the connector 80. Accordingly, the connector 80 is captivated in the passage 92. After the connectors are in place, the thermostat 42 may be inserted into the cavity with the prongs 52 extending into the passages 92, 94 into registry with the connectors 80.

The mounting means 46 comprises the arms 66, 68 of the receptacle 44, a pair of bosses 126, 128 comprising an integral part of the tub 12 and a metallic liner 130 underneath the tub bottom 34. The bosses 126, 128 are formed during molding of the tub 12 and may be of any suitable cross section having a blind opening therein. Self-tapping screws 132, 134 extend through openings 136, 138 in the arms 66, 68 respectively and captivate the same against the bosses 126, 128. The arm 68 is secured to the metal liner 130 by a self-tapping metal screw 140 which extends through an elongate opening 142 in the arms 68.

Figure 2:
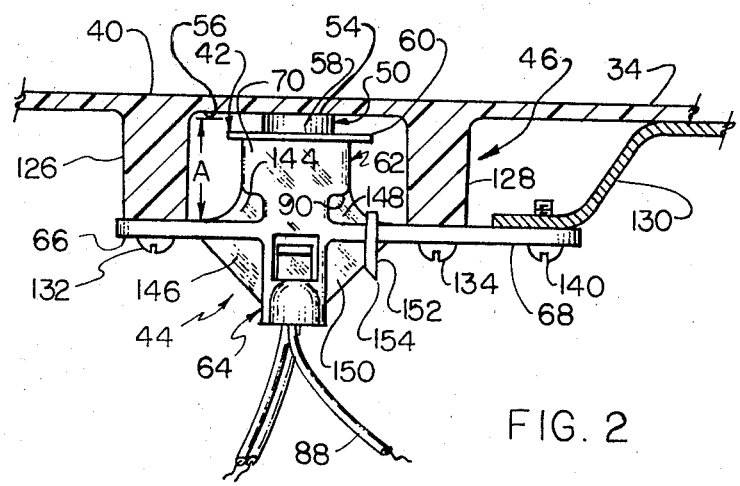
FIG. 2 is an enlarged cross sectional view of the dishwasher of FIG. 1 taken substantially along line 2—2 thereof as viewed in the direction indicated by the arrows.
Figure 3:
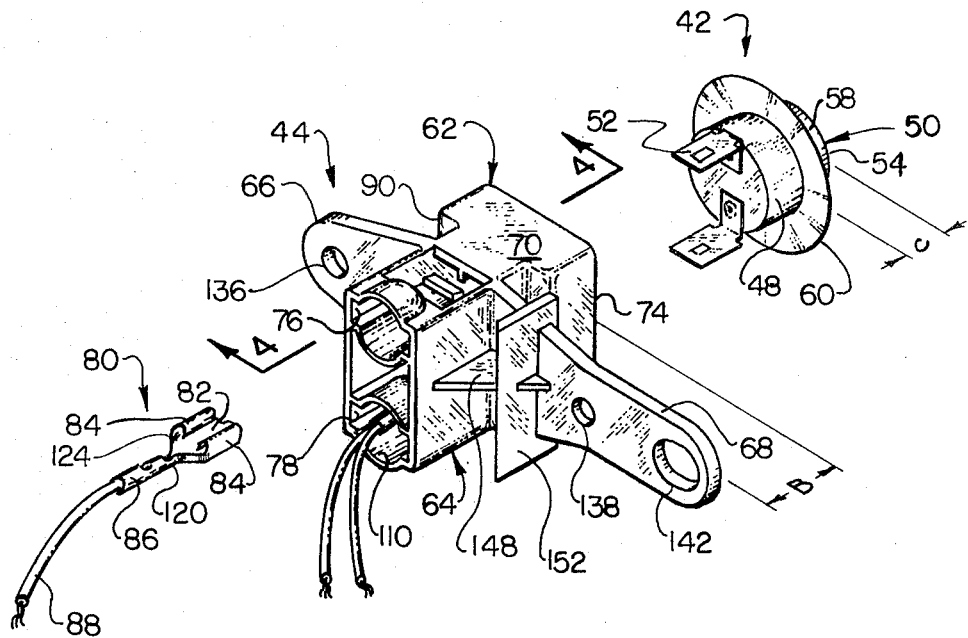
FIG. 3 is an exploded isometric view of the thermostat and receptacle of this invention.

An important feature of this invention constitutes the pressing or binding of the heat transfer member 50 into heat exchange relation with the undersurface 56 of the wall section 40. It will be appreciated that the member 50 should be firmly pressed against the undersurface 56 independent of manufacturing tolerances, thermal growth of the bosses 126, 128 and bowing or warping of the wall section 40. To accomplish these functions, there is provided an interference fit between the receptacle 44, the thermostat 42 and the undersurface 56. Referring to FIG. 2, the dimension A indicates the distance from the plane defined by the bottom of the bosses 126, 128 to the undersurface 56 prior to placement of the thermostat 42 and receptacle 44. Referring to FIG. 3, the dimension B indicates the distance from the top of the arms 66, 68 to the edge 74 while the dimension C is the distance from the bottom of the flange 60 to the top 54. To assure an interference fit, the sum of the dimensions B and C exceeds the dimension A by a distance in the range of 0.015–0.080 inches. Accordingly, either the wall section 40 or the arms 66, 68 are deflected to accommodate the mismatch. It is preferred that the wall section 40 be deflected. Accordingly, there are provided gussets 144, 146 connecting the arm 66 to the sections 62, 64 respectively and gussets 148, 150 connecting the arm 68 to the sections 62, 64 respectively. Accordingly, the arms 66, 68 are rigid and the wall section 40 is deflected upon placement of the receptacle 44.

In operation, it has been learned that water tends to condense on the metal liner 130 and move toward the sections 62, 64. It is desirable to prevent condensate from reaching the electrical components in the receptacle 44. There is accordingly provided a dam-like member 152 perpendicular to the arm 68 between the sections 62, 64 and the opening 142. As shown in FIGS. 2 and 3 the member 152 extends above the arm 68 tending to block water movement toward the section 62. As seen best in FIG. 3, the member 152 extends laterally further than the arm 68 thereby allowing water to pass downwardly along the member 152. The lower edge of the member 152 comprises a bevel 154 allowing water to drip readily from the member 152.

I claim:

1. A dishwasher of the type comprising a tub and a door together providing a wash chamber, means for heating the wash chamber, a thermostat for deenergizing the heating means in response to a predetermined temperature in the wash chamber and means mounting the thermostat in heat exchange relation with the wash chamber, the improvement wherein the tub includes an imperforate wall section having a surface exposed to the wash chamber and an opposite surface;

the thermostat includes a body having a flange extending outwardly therefrom past the periphery of the thermostat body and a metallic heat transfer member, including a central projection, between said wall section and said body mating with the opposite surface of the imperforate wall section; and the mounting means includes means comprising a receptacle having a cavity therein for receiving the thermostat body and an upper edge abutting said flange and means securing said receptacle to said tub thereby binding the heat transfer member against the opposite surface.

2. The dishwasher of claim 1 wherein the receptacle is made of a material having a heat transfer capability less than the heat transfer member, the cavity and the heat transfer member substantially enclosing the thermostat body.

3. The dishwasher of claim 1 wherein the securing means comprises a member extending on opposite sides of the receptacle and means fastening the opposite sides of the member to the tub, the wall section and the member being deflected away from each other.

4. The dishwasher of claim 3 wherein the fastening means comprises bosses extending away from the tub on opposite sides of the imperforate wall section and threaded fasteners secured to the bosses.

5. The dishwasher of claim 3 wherein the tub comprises a unipartite organic resin structure and a metallic liner exterior of the tub secured to the member.

6. The dishwasher of claim 5 comprising a vertical member extending across the securing member beyond the limits thereof between the liner and the receptacle for diverting water moving from the liner away from the receptacle.

7. The dishwasher of claim 3 wherein the imperforate wall section is more flexible than the member, the mounting means placing the heat transfer member in a position deflecting the wall section away from its relaxed position.

8. The dishwasher of claim 1 wherein the receptacle includes at least one passage extending from the cavity away from the thermostat body, the thermostat includes a prong extending in the direction of the passage, and further comprising a terminal in the passage electrically connected to the prong, and a lead connected to the terminal extending out of the passage, and wherein the receptacle includes means preventing movement of the terminal through the passage.

* * * * *